United States Patent
Chikada et al.

(10) Patent No.: US 7,627,676 B2
(45) Date of Patent: *Dec. 1, 2009

(54) COMMUNICATION CONTROL METHOD, COMMUNICATION CONTROL APPARATUS AND STORAGE MEDIUM

(75) Inventors: Michiyasu Chikada, Chiba (JP); Tetsuya Taniguchi, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 27 days.

This patent is subject to a terminal disclaimer.

(21) Appl. No.: 11/284,777

(22) Filed: Nov. 21, 2005

(65) Prior Publication Data

US 2006/0161649 A1 Jul. 20, 2006

Related U.S. Application Data

(63) Continuation of application No. 09/581,632, filed on Jun. 13, 2000, now Pat. No. 7,003,568.

(51) Int. Cl.
  *G06F 13/00* (2006.01)
(52) U.S. Cl. .............. 709/225; 709/224; 709/228; 370/216; 455/401
(58) Field of Classification Search .......... 709/224.225, 709/227, 226, 238; 707/203; 715/701; 455/452, 455/453
See application file for complete search history.

(56) References Cited

U.S. PATENT DOCUMENTS

| | | | |
|---|---|---|---|
| 5,539,923 A * | 7/1996 | Matsumoto | 455/443 |
| 5,541,976 A | 7/1996 | Ghisler | |
| 5,561,770 A | 10/1996 | De Bruijn et al. | |
| 5,566,225 A | 10/1996 | Haas | |
| 5,761,507 A * | 6/1998 | Govett | 718/101 |
| 5,818,918 A | 10/1998 | Fujii | |
| 5,854,897 A | 12/1998 | Radziewicz et al. | |
| 5,907,676 A | 5/1999 | Fujishiro et al. | |
| 5,944,831 A | 8/1999 | Pate et al. | |
| 5,987,621 A | 11/1999 | Duso et al. | |
| 6,070,191 A * | 5/2000 | Narendran et al. | 709/226 |
| 6,134,436 A * | 10/2000 | Ezaki | 455/426.1 |
| 6,208,616 B1 | 3/2001 | Mahalingam et al. | |
| 6,208,718 B1 | 3/2001 | Rosenthal | |

(Continued)

FOREIGN PATENT DOCUMENTS

EP  0 946 068 A2  9/1999

(Continued)

OTHER PUBLICATIONS

Chinese Office Action dated Mar. 31, 2006, two (2) pages.

*Primary Examiner*—Khanh Q Dinh
(74) *Attorney, Agent, or Firm*—Brinks Hofer Gilson & Lione

(57) ABSTRACT

Even if a communication is interrupted, a communication control module in a data terminal reestablish the communication without informing a communication module that the communication has been interrupted in a case where it is possible to reestablish the communication. The communication control module determines that the communication can be reestablished if the interruption is temporary, or the condition of a network is good. The communication module does not recognize the interruption of the communication if the communication can be reestablished. Therefore, when the communication circuit is reestablished, the data communication is restored retrospectively to the time of the interruption of the communication.

21 Claims, 10 Drawing Sheets

U.S. PATENT DOCUMENTS

| | | | |
|---|---|---|---|
| 6,253,093 B1 * | 6/2001 | Yoshikawa | 455/557 |
| 6,253,334 B1 | 6/2001 | Amdahl et al. | |
| 6,263,207 B1 * | 7/2001 | Kito | 455/453 |
| 6,292,905 B1 * | 9/2001 | Wallach et al. | 714/4 |
| 6,314,525 B1 | 11/2001 | Mahalingham et al. | |
| 6,388,990 B1 | 5/2002 | Wetzel | |
| 6,507,863 B2 * | 1/2003 | Novaes | 709/201 |
| 6,584,506 B1 | 6/2003 | Perlman et al. | |
| 6,594,485 B1 | 7/2003 | Ezaki | |
| 6,622,172 B1 * | 9/2003 | Tam | 709/232 |
| 7,003,568 B1 * | 2/2006 | Chikada et al. | 709/225 |
| 7,020,717 B1 * | 3/2006 | Kovarik et al. | 709/238 |
| 7,085,809 B2 * | 8/2006 | Mori et al. | 709/203 |

FOREIGN PATENT DOCUMENTS

| | | |
|---|---|---|
| JP | H2 186743 | 7/1990 |
| JP | H3 52439 | 3/1991 |
| JP | H4 102152 | 4/1992 |
| JP | H5 22349 | 1/1993 |
| JP | H7 273762 | 10/1995 |
| JP | H8 249255 | 9/1996 |
| JP | H9 289679 | 11/1997 |
| JP | H10-243053 | 9/1998 |
| JP | H11 187146 | 7/1999 |

* cited by examiner

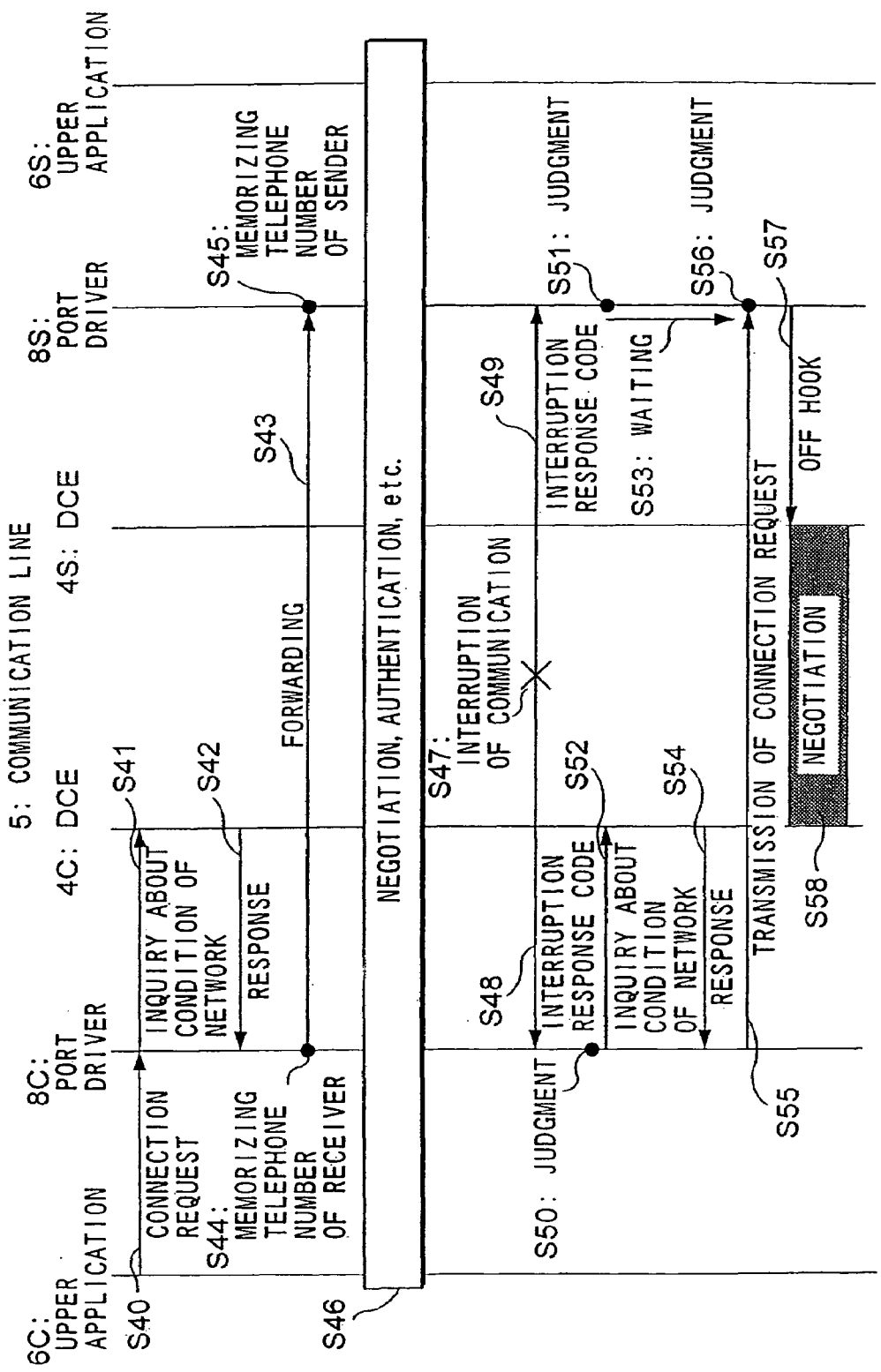

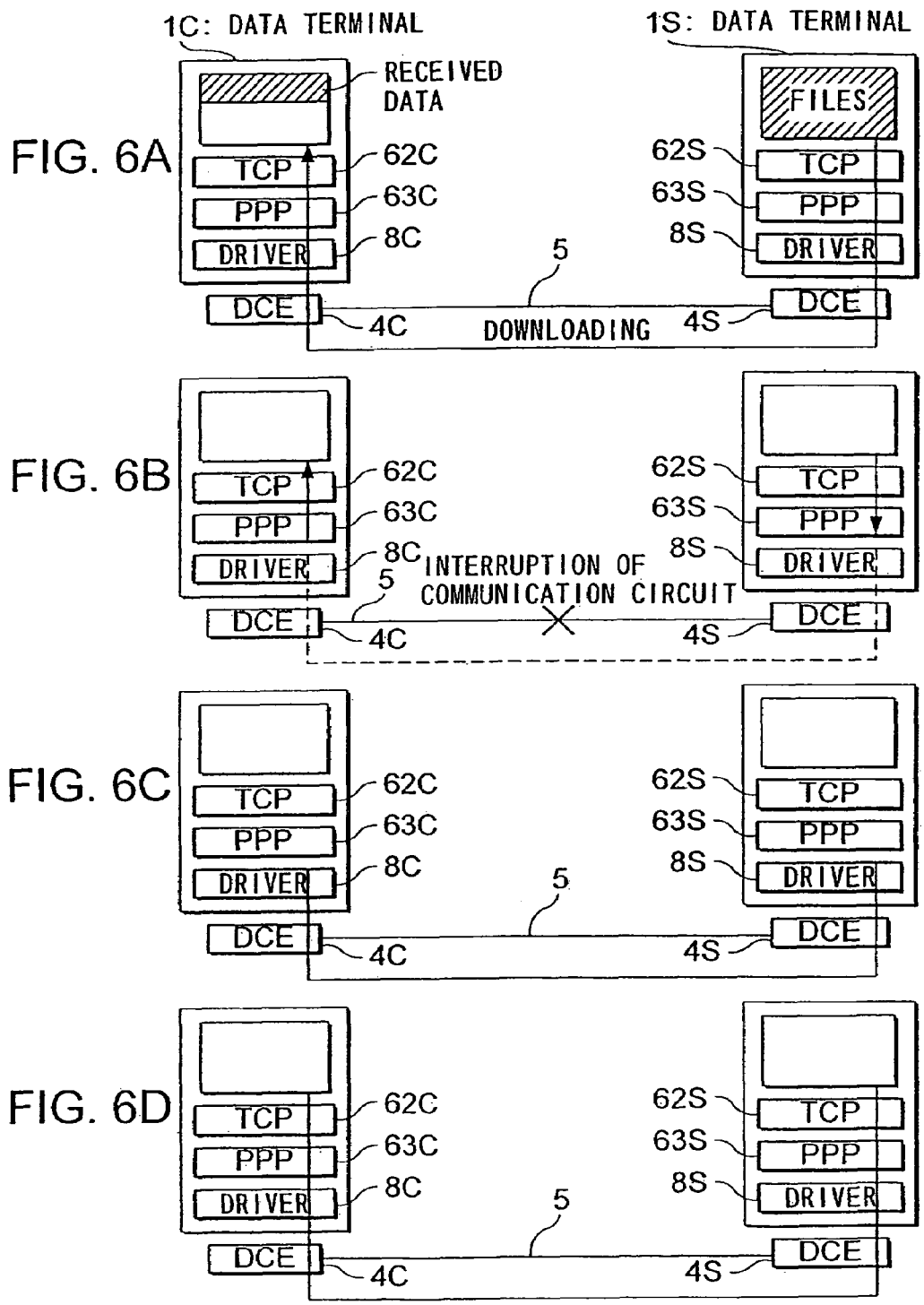

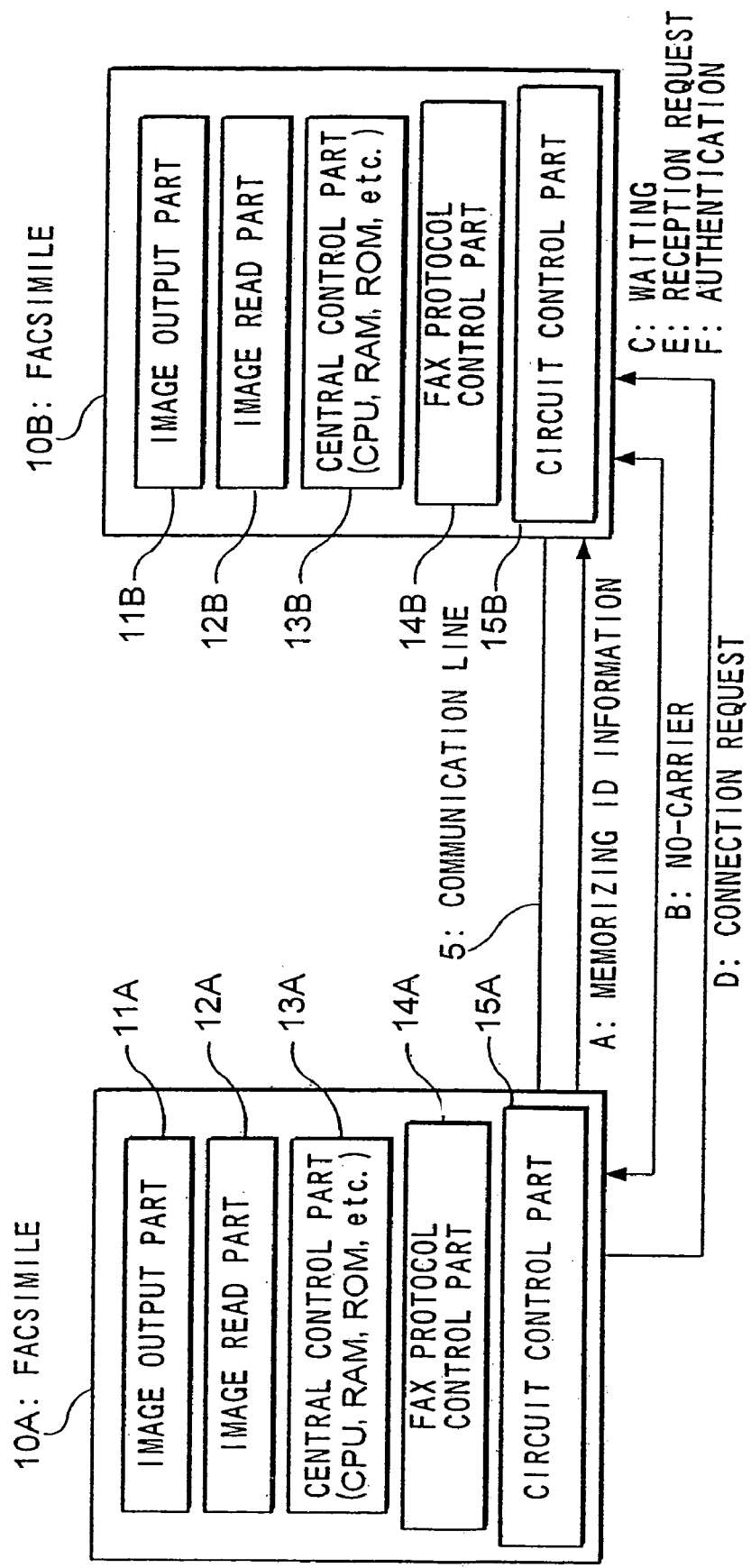

COMMUNICATION CONTROL METHOD, COMMUNICATION CONTROL APPARATUS AND STORAGE MEDIUM

This application is a continuation of patent application Ser. No. 09/581,632 filed Jun. 13, 2000, now U.S. Pat. No. 7,003,568.

TECHNICAL FIELD

The present invention relates to a communication control method for a communication system in which a plurality of data terminals can communicate with each other through a wired or wireless communication network, a communication apparatus for implementing the communication control method and a storage medium for storing communication control programs embodying the communication control method.

BACKGROUND ART

A communication system is prevalent in which a plurality of data terminals, such as personal computers, communicate with each other through a wired or wireless communication network for data transmission to or from another data terminal. In such a communication system, each data terminal has a communication module. This communication module is a module executed by a control part provided in the data terminal in order to perform communication with another data terminal through a communication network.

While a data terminal is performing a data communication with another data terminal, however, the communication is sometimes interrupted for an unexpected cause, for instance, an occurrence of a trouble in the network or steep deterioration of the quality of the communication line. In such cases, the communication module in the data terminal receives a notification that the communication has been interrupted and then ends the communication. Therefore, when a communication is interrupted, the user has to do the same operations allover again from the beginning to start the communication module to reconnect the data terminal with the other data terminal through the communication network.

For example, during downloading of desired data with a personal computer, if the communication is interrupted for an unexpected cause, the user has to start again the application program for the downloading to download the desired data from its beginning. Also, during access to a homepage on the Internet, using a browser, if the communication is interrupted, the user has to reestablish the communication to access the homepage again. Therefore, the user is sometimes prevented from doing continuous surfing on the Internet.

As described above, if the communication is interrupted, the user has to do the same procedures for reestablishing the communication and start downloading data allover gain from the very beginning. This problem increases the load on the user and makes expensive charges to be paid to the operator operating the personal computer communication.

DISCLOSURE OF THE INVENTION

The present invention is made, considering the above-described circumstances, and an object of the present invention is to provide a communication control method, a communication control apparatus and a storage medium which, even if a communication is interrupted, can reestablish the communication without increasing the load on a user.

In order to attain such an object, the present invention is to provide a communication control method for data terminals with data communication module for transmitting data or receiving data between data terminals over a communication network. The method includes steps of detecting an interruption of a communication and, when an interruption of the communication is detected, reestablishing the communication without notifying the data communication module of the interruption of the communication.

According to this communication control method, even if a communication is interrupted, the data communication module in the data terminal does not recognize the interruption of the communication. Therefore, when the communication is reestablished, the data communication can be restarted with the data that remained to be communicated at the time when the communication line was interrupted.

This communication control method may include a step of judging whether to reestablish the interrupted communication. The interrupted communication is reestablished without notifying the data communication module of the interruption of the communication when the interruption of the communication is detected, and it is judged that the communication can be reestablished.

In the judging step, the judgment as to whether or not the communication can be reestablished is made based on a cause for the interruption of the communication. Therefore, attempts can be avoided that would be made to reestablish the communication despite the fact that it is impossible to reestablish the communication.

In addition, the communication control method may further include a step of diagnosing the condition of the network. The judgment as to whether or not the interrupted communication can be reestablished is made based on the diagnosed condition of the network. Therefore, attempts can be avoided that would be made to reestablish the communication despite the fact that the condition of the network is not good.

On the other hand, the present invention can be realized by a communication control apparatus for implementing the communication control method. In addition, the present invention can be realized by a storage medium for storing a communication control program embodying the communication control method.

BRIEF DESCRIPTION OF DRAWINGS

FIG. 5 is a sequence chart showing operations for establishing and reestablishing a communication according to the same embodiment.

FIG. 6A is a block diagram showing that a client data terminal is downloading data from a server data terminal through a communication network; FIG. 6B is a block diagram showing a situation where the communication is interrupted; FIG. 6C is a block diagram showing a situation where the interrupted communication is reestablished; and FIG. 6D is a block diagram showing a situation after the reestablishment of the communication is completed.

FIG. 7 is a block diagram showing the constitution of a communication system adopting the communication control method according to a second preferred embodiment of the present invention.

DETAILED DESCRIPTION OF THE INVENTION

The preferred embodiments of the present invention will hereinafter be discussed with reference to the attached drawings.

Figure 9:
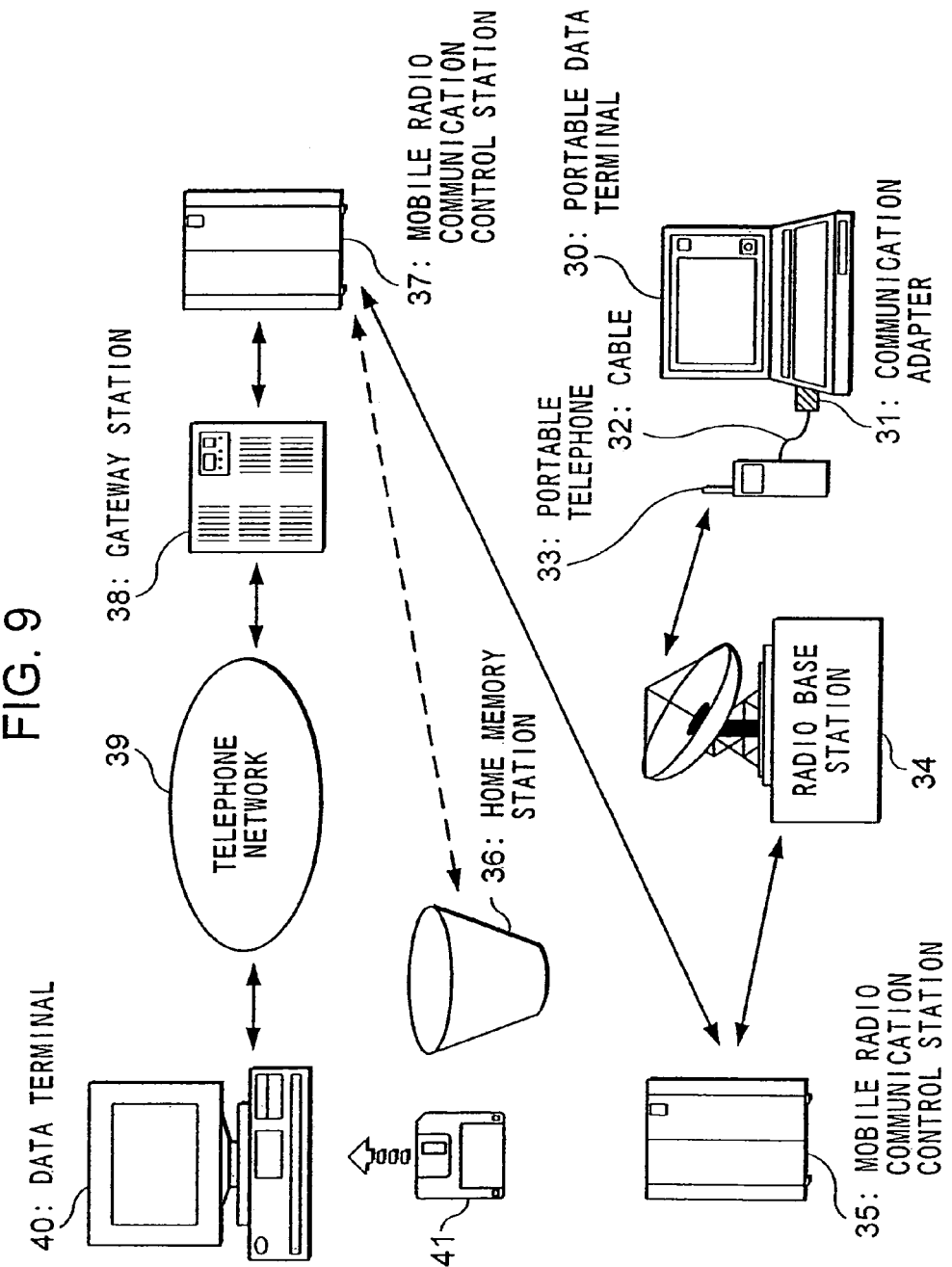
FIG. 9 is a block diagram showing the constitution of a communication system adopting the communication control method according to a third preferred embodiment of the present invention.

FIG. 9 shows the constitution of a communication system adopting the communication control method according to the present invention.

The communication system, as shown in FIG. 9, includes a portable telephone 33, a communication adapter (PC card) 31, a cable 32, a portable data terminal 30, a radio base station 34, mobile radio communication control stations 35 and 37, a home memory station 36, a gateway station 38, a telephone network 39 and a data terminal 40. The portable data terminal 30 is a notebook-type personal computer, for example. The portable telephone 33 and the portable data terminal 30 are connected to each other through the cable 32 and the communication adapter 31. More specifically, one end of the cable 32 is connected to the portable telephone 33, and the other end of the cable 32 is connected to the communication adapter 31 inserted in a card slot of the portable data terminal 30. This communication adapter 31 functions to modulate data outputted from the portable data terminal 30 into radio signals and demodulate radio signals received through the portable telephone 33. In the constitution described above, the portable data terminal 30 can perform data communication with the data terminal 40 through a communication network comprised of the portable telephone 33, the radio base station 34, the mobile radio communication control stations 35 and 37, the gateway station 38 and the telephone network 39.

A: The Principle of the Present Invention

Before getting into the details of embodiments of a communication system adopting the communication control method according to the present invention, the present invention should be discussed in general.

Figure 1:
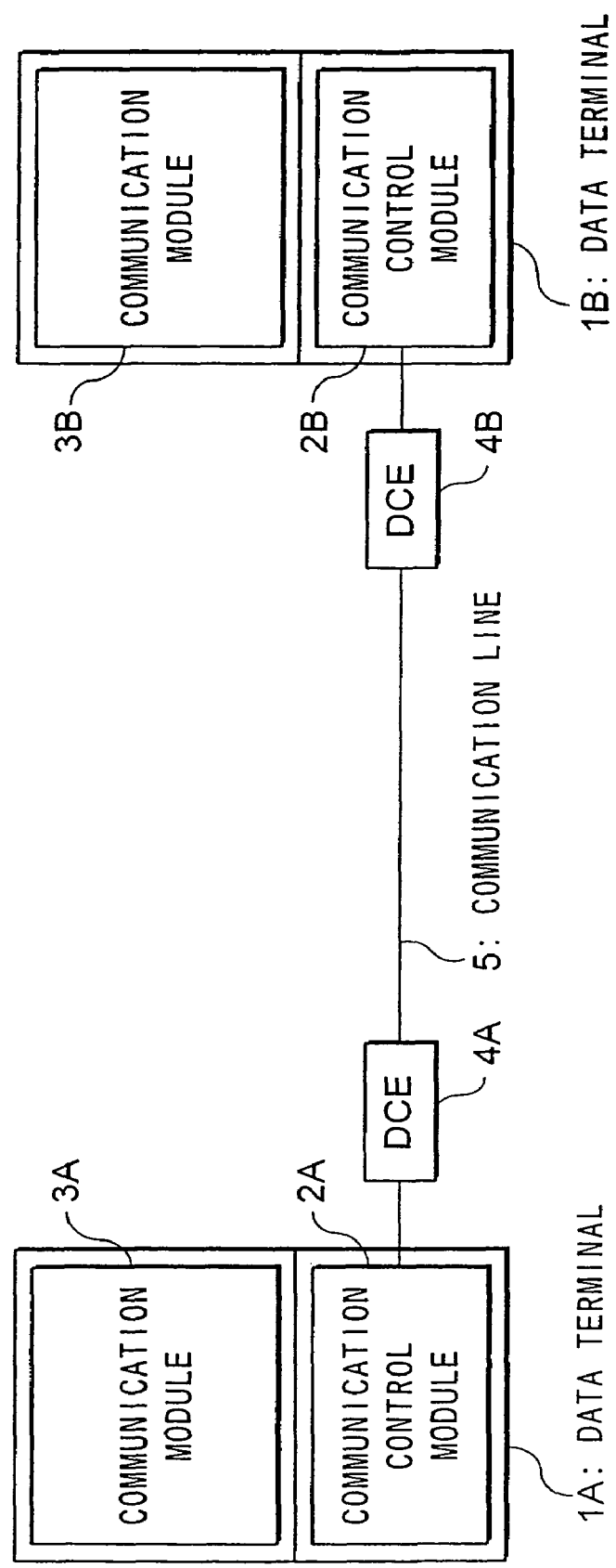
FIG. 1 is a block diagram showing the principle of the present invention.

First, the conceptual constitution of a communication system adopting the communication control method according to the present invention will be discussed with reference to FIG. 1. As shown in FIG. 1, this communication system includes data terminals 1A and 1B, DCE (Data Circuit terminating Equipment) 4A, DCE 4B and a communication line 5. FIG. 1 illustrates a situation where the data terminals 1A and 1B are connected to each other through the communication line 5 established in a network. The data terminal 1A is connected to the DCE 4A. The DCE 4A relays data between the data terminal 1A and the communication line 5. The data terminal 1B is connected to the DCE 4B. The DCE 4B relays data between the data terminal 1B and the communication line 5. The DCE 4A and DCE 4B are equivalent to the communication adapter 31 in the communication system shown in FIG. 9. One data terminal can transmit data to and receive data from the other data terminal over a connection through the DCE 4A, the communication line 5 and the DCE 4B.

The data terminal 1A has a communication module 3A and a communication control module 2A. The communication module 3A and the communication control module 2A are programs executed by a control part provided in the data terminal 1A. More specifically, the communication module 3A is a module for transmitting data to or receiving data from the data terminal 1B connected to the data terminal 1A through the communication line 5. The communication control module 2A is a module for controlling data communication performed by the communication module 3A. The data terminal 1B has a communication module 3B and a communication control module 2B similar to those in the data terminal 1A.

Figure 2:
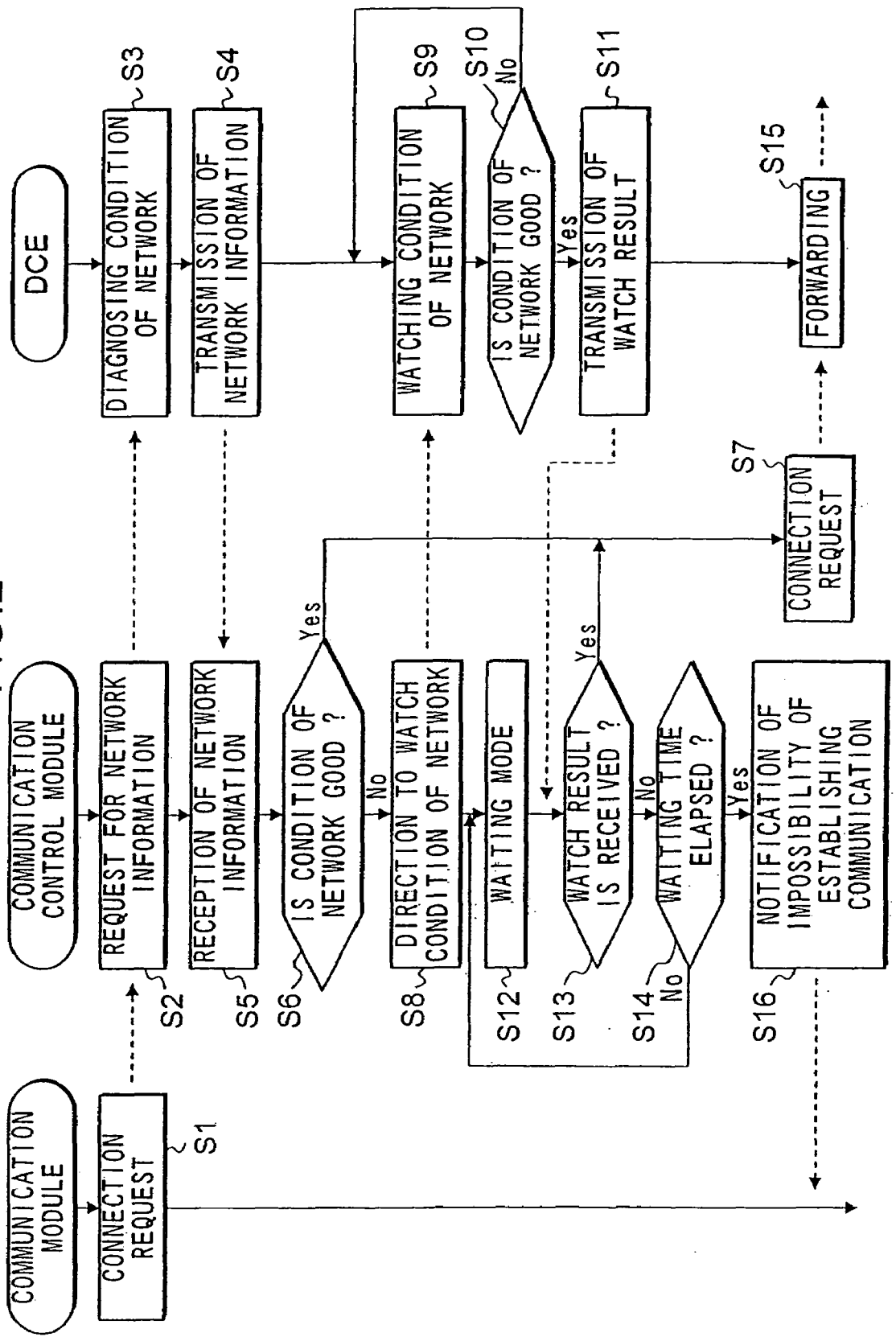
FIG. 2 is a flowchart showing operations for reestablishing a communication.

FIG. 2 illustrates operations for connecting the data terminal 1A to the data terminal 1B through the communication line 5.

First, receiving from a user a command to perform a data communication with the data terminal 1B, the communication module 3A in the data terminal 1A sends a connection request to the communication control module 2A (step S1). When the communication control module 2A receives this connection request, it requests to the DCE 4A information on the present condition of the network (step S2). When the DCE 4A receives this request, it diagnoses the present condition of the network (step S3). For example, the DCE 4A diagnoses the condition of the network, based on control signals sent from the network. More specifically, the DCE 4A determines whether or not traffic congestion has occurred on the network, whether or not a trouble has occurred in the network, whether or not any line is available or the like. If the receiving data terminal 1B is the portable computer as shown in FIG. 9 that is connected to the network through the portable telephone 33, the DCE 4A also detects whether or not the portable telephone 33 is found within the wireless zone formed by the radio base station 34. Similarly, if the sending data terminal 1A is the portable data terminal as shown in FIG. 9 that is connected to the network through the portable telephone 33, the DCE 4A detects whether or not the portable telephone 33 is found within the wireless zone formed by the radio base station 34. The DCE 4A sends results of the detection (network information) to the communication control module 2A (step S4).

When the communication module 2A receives the network information (step S5), it analyzes it and judges, based on the network information, whether or not the present condition of the network is good (step S6). "The condition of the network is good" means that there are no problems with establishing a communication between the data terminals 1A and 1B. More specifically, the communication control module 2A determines that the condition of the network is good when the following are true:

(1) there is no traffic congestion on the network;
(2) there are no troubles in the network;
(3) the portable telephone 33 is found within the wireless zone formed by the radio base station 34 in a case where the receiving data terminal 1B is the portable data terminal connected with the portable telephone 33 as shown in FIG. 9; and
(4) the portable telephone 33 is found within the wireless zone formed by the radio base station 34 in a case where the sending data terminal 1A is the portable data terminal connected with the portable telephone 33 as shown in FIG. 9.

In contrast, "The condition of the network is not good" means that there is a problem with connecting the data terminal 1A to the data terminal 1B through the communication line 5. More specifically, the communication control module 2A determines that the condition of the network is not good when any one of the following is true:

(1) There is traffic congestion on the network;
(2) there is a trouble in the network;
(3) the portable telephone 33 is not found within the wireless zone formed by the radio base station 34 in a case where the receiving data terminal 1B is the portable data terminal connected with the portable telephone 33 as shown in FIG. 9; or
(4) the portable telephone 33 is not found within the wireless zone formed by the radio base station 34 in a case where the sending data terminal 1A is the portable data terminal connected with the portable telephone 33 as shown in FIG. 9.

If the communication control module 2A determines in step S6 that the condition of the network is good, it sends a connection request to the DCE 4A (step S7).

In contrast, if the communication control module 2A determines that the condition of the network is not good, it sends DCE 4A a directive to watch the condition of the network (step S8). In this step, the communication control module 2A does not inform the communication module 3A that there is a problem with establishing a communication.

When the DCE 4A receives this directive, its operation mode switches over to a watching mode (steps S9 to S11). More specifically, this is done as follows;

It has been detected in step S3 that the condition of the network is not good. The DCE 4A performs the same detection operation in step S9 and repeats the operation at regular intervals until it detects that the problem of the network has been cleared (steps S9 and S10). If the DCE 4A determines that the problem of the network is cleared, that is to say, if the condition of the network has turned good, the DCE 4A sends a watch result to the communication control module 2A (step S11). This watch result indicates that the condition of the network is now good.

On the other hand, the communication control module 2A switches its operation mode to a waiting mode (steps S12 to S14) after the communication control module 2A sends the DCE 4A the directive to watch the condition of the network in Step 8. That is to say, the communication control module 2A waits for a fixed time (described below as "a waiting time") from the time when it sends the directive. If the communication control module 2A receives the watch result from the DCE 4A, that is to say, if the condition of the network turned good, before the waiting time lapses (step S13; Yes), it outputs a connection request to the DCE 4A (step S7).

In contrast, if the communication control module 2A does not receive the watch result, that is to say, if the condition of the network does not turn good, within the waiting time (step S14; Yes), it informs the communication module 3A that it is impossible to establish the communication (step S16). When the communication module 3A is so informed, it informs the user that it is impossible to establish the communication and ends the operations for data communication.

On the other hand, when the DCE 4A receives the connection request from the communication control module 2A in step S7, it forwards this connection request to the network (step S15). The communication control module 2B in the receiving data terminal 1B receives this circuit connect request through the network. The communication line 5 between the data terminals 1A and 1B is established after a series of operations such as a negotiation, an authentication and the like are performed. After this, the communication module 3A in the data terminal 1A and the communication module 3B in the data terminal 1B transmit data to and receive data from each other through this communication line 5.

Figure 3:
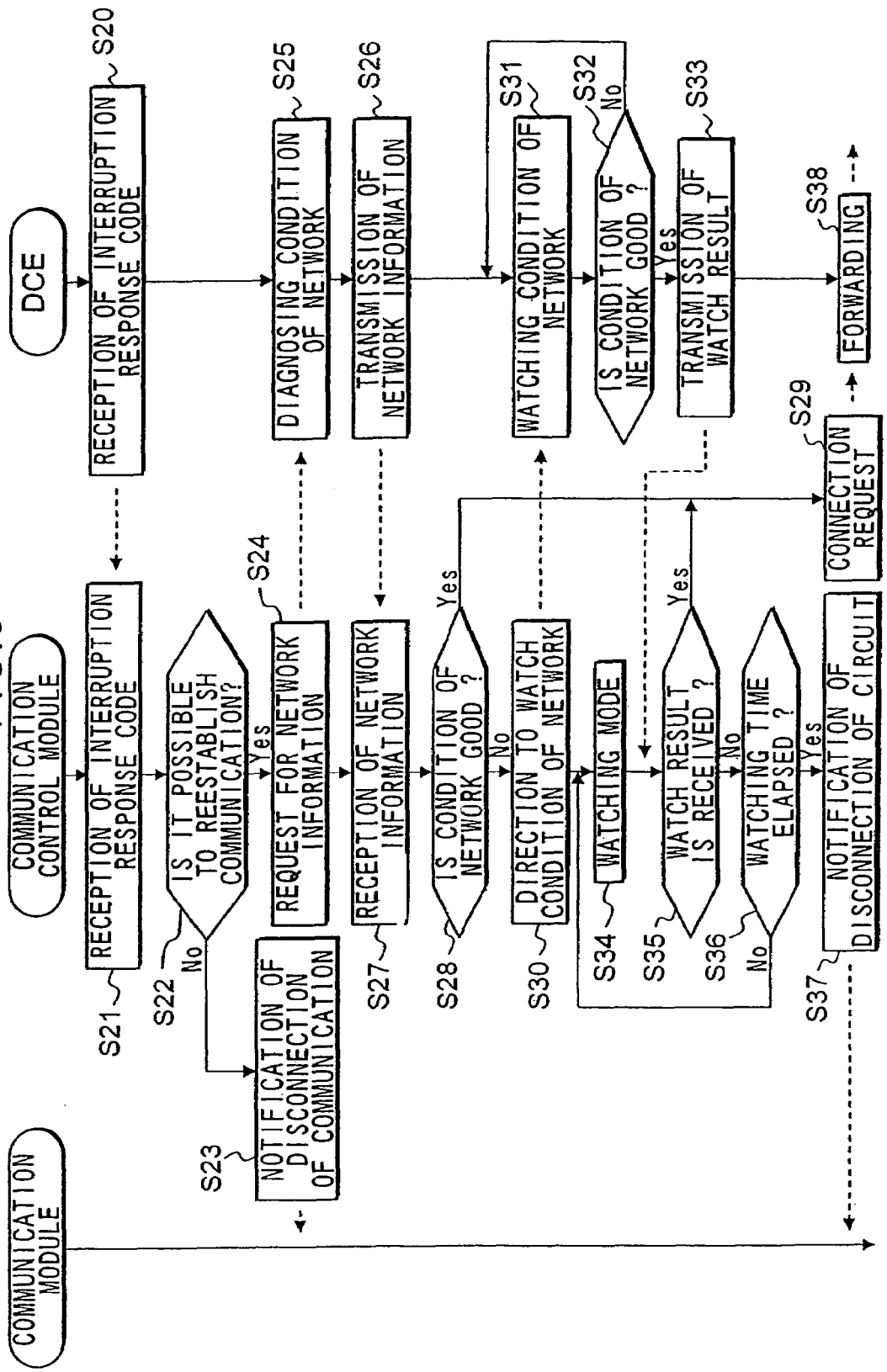
FIG. 3 is a flowchart showing operations for reestablishing a communication after the communication is interrupted.

The operations performed in this communication system will be discussed with reference to FIG. 3. Suppose that the communication is interrupted for an unexpected cause after the data terminals 1A and 1B are connected to each other through the communication line 5 according to the processes described above.

First, when the communication line 5 is interrupted, an interruption response code is sent from the network to the data terminals 1A and 1B. The interruption response code includes information indicating the fact that the communication line is interrupted and the cause for the interruption.

A possible cause for an interruption of a communication is as follows:

(1) there is traffic congestion on the network;
(2) there is a trouble in the network;
(3) the portable telephone 33 moves out of the wireless zone formed by the radio base station 34 in a case where the receiving data terminal 1B is the portable data terminal connected to the portable telephone 33 as shown in FIG. 9; or
(4) the portable telephone 33 moves out of the wireless zone formed by the radio base station 34 in a case where the sending data terminal 1A is the portable data terminal connected to the portable telephone 33 as shown in FIG. 9.

The communication control module 2A in the data terminal 1A receives this interruption response code through the DCE 4A (steps S20 and S21). The communication control module 2A then judges, based on the interruption response code, whether or not it is possible to reestablish the interrupted communication (step S22). More specifically, if the cause of the interruption is such that the interruption is temporary, or the problem can be solved in a time, the communication control module 2A determines that it is possible to reestablish the communication.

For example, the communication control module 2A determines that it is possible to reestablish the communication if the interruption was caused by one of the following:

(1) there is traffic congestion on the network;
(2) the portable telephone 33 shown in FIG. 9 moved out of the wireless zone formed by the radio base station 34 in a case the receiving data terminal 1B is the portable data terminal connected to the portable telephone 33 as shown in FIG. 9; or
(3) the portable telephone 33 shown in FIG. 9 moved out of the wireless zone formed by the radio base station 34 in a case where the sending data terminal 1A is the portable data terminal connected to the portable telephone 33 as shown in FIG. 9.

On the other hand, if the cause of the interruption is such that there is no or very little hope that the problem will be solved in a time, the communication control module 2A determines that it is impossible to reestablish the communication.

For example, the communication control module 2A determines that it is impossible to reestablish the communication if the cause of the interruption is any one of the following;

(1) the receiving data terminal 1B rejects a data communication with the data terminal 1A;
(2) the receiving data terminal 1B has broken down;

(3) no response has been sent back from the data terminal 1B; or (4) an insoluble problem has happened in the network.

If the communication control module 2A determines in step S22 that it is impossible to reestablish the communication, it informs the communication module 3A that the communication line 5 is disconnected (step S23). When the communication module 3A receives this notification, it informs the user that the communication line is disconnected and ends the operations for the data communication between the data terminals 1A and 1B.

In contrast, if the communication control module 2A determines that it is possible to reestablish the communication, it performs operations for reestablishing the interrupted communication without informing the communication module 3A of the interruption of the communication. More specifically, these operations are as follows:

First, the communication control module 2A requests to the DCE 4A information on the condition of the network (step S24). When the DCE 4A receives this request, it diagnoses the condition of the network (step S25) and sends results of the diagnosis (network information) to the communication module 2A (step S26).

When the communication control module 2A receives the network information (step S27), it judges whether or not the present condition of the network is good (step S28). If the communication control module 2A determines that the condition of the network is good, it sends the DCE 4A a directive to perform a retransmission (step S29).

On the other hand, if the communication module 2A determines in step S28 that the condition of the network is not good, it sends the DCE 4A a directive to watch the condition of the network (step S30).

When the DCE 4A receives this directive, its operation mode switches to a watching mode (steps S31 to S33). That is to say, the DCE 4A diagnoses the condition of the network at regular intervals. As a result of this diagnosis, if the DCE 4A determines that the problem that happened in the network has now been solved (step S32; Yes), it sends this watch result to the communication control module 2A (step S33). In contrast, if the problem in the network has not been solved, the DCE 4A repeats the same diagnosis at regular intervals (steps S31 and S32).

On the other hand, when the communication control module 2A in step S30 sends the DCE 4A the directive to watch the condition of the network, its operation mode switches to a waiting mode, and it waits for the waiting time to lapse (steps S34 to S36). If the communication control module 2A receives the watch result before the waiting time elapses (step S35; Yes), that is to say, if the condition of the network has turned good, it outputs a connection request to the DCE 4A (step S29).

In contrast, if the communication control module 2A does not receive the watch result from the DCE 4A before the waiting time elapses, that is to say, if the condition of the network would has not turned good (step S36; Yes), it informs the communication module 3A that the communication has been disconnected (step S37). When the communication module 3A receives this notification, it informs the user that it is impossible to reestablish the communication and ends the operations for performing the data communication.

On the other hand, if the connection request is sent from the communication control module 2A in step S29, the DCE 4A forwards the connection request to the network (step S38). The communication control module 2B in the receiving data terminal 1B receives this connection request through the network. Thereafter, a series of operations such as a negotiation, an authentication of the sender and the like are performed, and the communication line 5 between the data terminals 1A and 1B is reestablished.

As described above, according to the present invention, even if the communication is unexpectedly interrupted, the communication module 3A is not informed of the interruption of the communication in a case where it is possible to reestablish the communication. That is to say, since the communication module 3A does not recognize the interruption of the communication line 5, it will proceed to perform the same operation that has been halted since the communication circuit was interrupted. Therefore, when the communication is reestablished, the data communication will be restored retrospectively to the time of the interruption.

In addition, since establishing or reestablishing of the communication is performed only if the condition of the network is good, it is possible to eliminate the execution of the unnecessary operations for attempting to re-send data despite the fact that the condition of a network is not good.

The following describes preferred embodiments of a communication system adopting the communication control method according to the present invention.

B: First Preferred Embodiment

Figure 4:
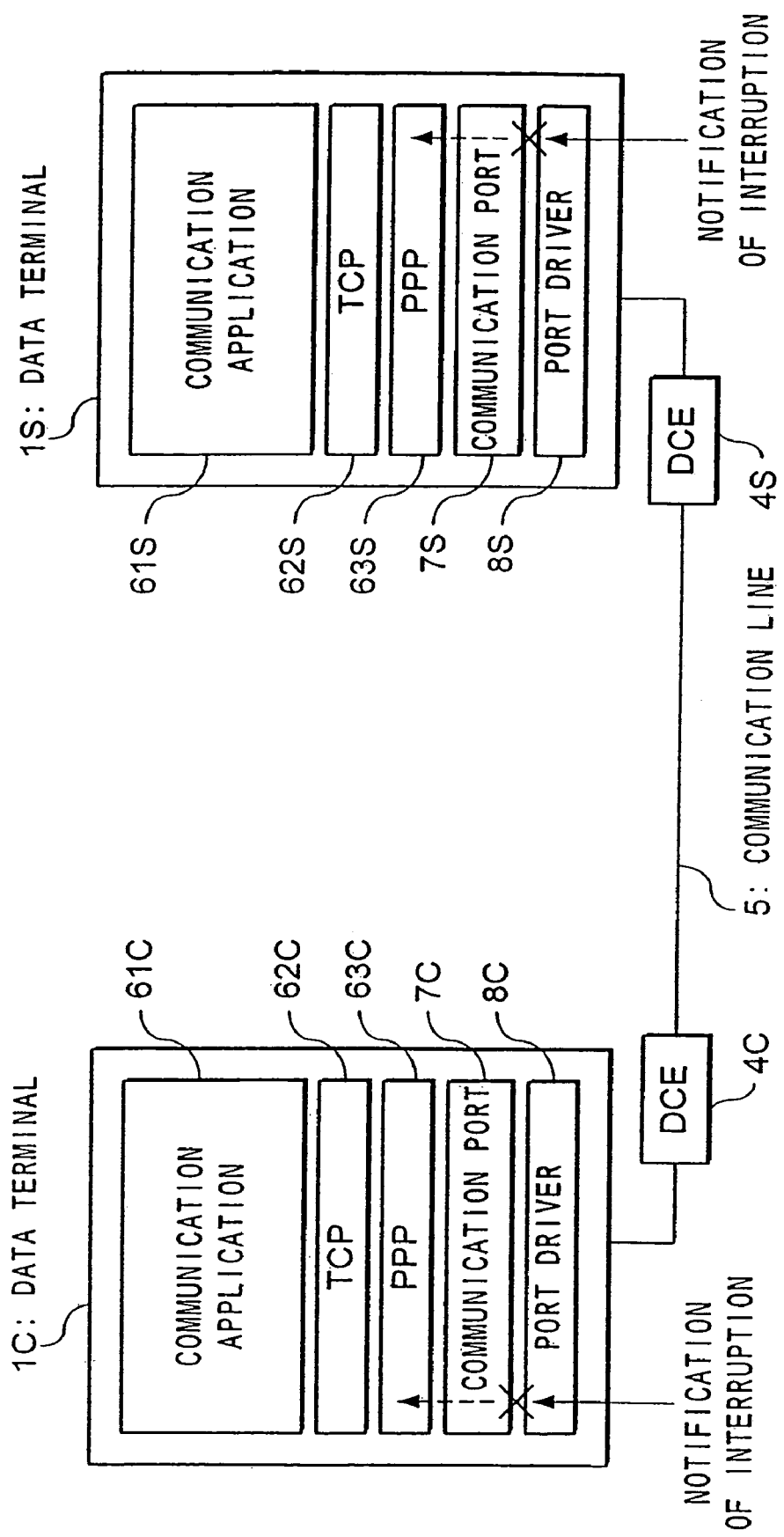
FIG. 4 is a block diagram showing the constitution of a communication system adopting the communication control method according to the first preferred embodiment of the present invention.

FIG. 4 illustrates the constitution of a communication system adopting the communication control method according to the present invention. As shown in FIG. 4, this communication system includes data terminals 1C and 1S which are, for instance, personal computers, DCE 4C, DCE 4S and the communication line 5. In this embodiment, the data terminal 1C operates as a client. On the other hand, the data terminal 1S operates as a server which sends data in response to a request from the data terminal 1C operating as a client. The data terminal 1C is connected to the communication line 5 through the DCE 4C. The data terminal 1S is connected to the communication line 5 through the DCE 4S. The DCE 4C and DCE 4S are modems, for example.

The data terminal 1C includes a communication application 61C, a TCP 62C, a PPP 63C, a communication port 7C and a port driver 8C. The communication application 61C is an application program executed by a control part provided in the data terminal 1C when data communication is performed between the data terminals 1C and 1S. The TCP 62C is a protocol that functions to receive from the communication application 61C data to be sent to the data terminal 1S, determine to which application in the receiving data terminal 1S the data should be sent and add to the data information on its determination. The PPP 63C is a protocol for establishing an IP connection through a public telephone network. In the following, the communication applications 61C, TCP 62C and PPP 63C are collectively indicated as "an upper application 6C". This upper application 6C is equivalent to the communication module 3A as shown in FIG. 1.

The DCE 4C is connected to the communication port 7C in the data terminal 1C. The port driver 8C functions to process signals outputted from the upper application 6C to the communication port 7C and signals inputted from the DCE 4C to the communication port 7C and to control data communication between the data terminals through the communication port 7C. In addition, the port driver 8C functions to reestablish the communication line 5 when the communication line 5 is interrupted (details are described later). This port driver 8C is equivalent to the communication control module 2A as shown in FIG. 1.

On the other hand, like the data terminal 1C described above, the server data terminal 1S includes an upper application 6S comprised of (a communication application 61S, TCP 62S and PPP 63S,) a communication port 7S and a port driver 8S.

With reference to FIG. 5, an explanation will be given of operations for establishing a communication and reestablishing the communication when the established communication line has been interrupted for an unexpected cause.

The operations for establishing a communication are as follows;

First, when a user of the client data terminal 1C gives the communication application 61C a command to start a data communication, it outputs a connection request specifying the server data terminal 1S (step S40). When the port driver 8C receives this connection request, it asks the DEC 4c about the condition of the network (step S41). The DCE 4C diagnoses the condition of the network in response to this inquiry. The DCE 4C sends a result of the diagnosis (network information) to the port driver 8C (step S42).

The port driver 8C judges whether or not the condition of the network is good, based on the network information sent from the DCE 4C. If the port driver 8C determines that the condition of the network is good, it forwards the connection request to the network (step S43). At the same time, the port driver 8C writes a telephone number of the server in a memory provided in the data terminal 1C. This telephone number of the server is included in the connection request described above. In this embodiment, the telephone number of the server is written in the memory in step S44. Please note, however, that such information is not only the information to be written in the memory in step S44. That is to say, the information to be memorized in the memory may include information for use in specifying the server data terminal 1S, such as the name of the server and its IP address.

On the other hand, the port driver 8S in the receiving data terminal 1S receives the connection request from the data terminal 1C through the network. The port driver 8S writes a telephone number of the client in a memory provided in the data terminal 1S (step S45). This telephone number of the client is included in the connection request. After this, a series of operations for establishing a communication, such as a negotiation and an authentication of the client, are performed by the DCE 4C and DCE 4S, and the data terminal 1C is thereafter connected to the data terminal 1S through the communication line 5 (step S46).

Next, if the communication line 5 established in this way is interrupted for an unexpected cause, operations, which will be described below in detail, for reestablishing the communication are performed.

First, when the communication is interrupted for an unexpected cause (step S47), an interruption response code is sent to the data terminals 1C and 1S from the network (steps S48 and S49). This interruption response code, as described above, includes information indicating the fact that the communication has been interrupted and the cause for the interruption.

The port driver 8S in the server data terminal 1S judges, based on the interruption response code received through the DCE 4S, whether or not it is possible to reestablish the communication line 5 (step S51). If the port driver 8S determines that it is possible to reestablish the communication, it waits, without informing the upper application 6S of the interruption of the communication, until a request for reestablishing the communication is sent from the data terminal 1C (step S53). On the other hand, if the port driver 8S determines in step S51 that it is impossible to reestablish the communication, it informs the upper application of the disconnection of the communication. As a result, the data communication is ended.

On the other hand, when the port driver 8C in the client data terminal 1C receives the interruption response code through the DCE 4C (step S48), it judges, based on this interruption response code, whether or not it is possible to reestablish the communication (step S50). If the port driver 8C determines that it is impossible to reestablish the communication, it informs the upper application 6C of the disconnection of the communication.

In contrast, if the port driver 8C determines that it is possible to reestablish the communication, it asks the DCE 4C about the condition of the network (step S52). After this, the port driver 8C switches its operation mode to the waiting mode. The port driver 8C does not inform the upper application of the interruption of the communication circuit 5.

The DCE 4C diagnoses the condition of the network in response to the inquiry from the port driver 8C as described above. As a result of this diagnosis, if the DCE 4C determines that the condition of the network has turned good, it sends the port driver 8C a watch result indicating that the condition of the network is now good (step S54).

When the port driver 8C receives this watch result, it reads the telephone number of the server memorized in step S44 and it sends a connection request to the data terminal 1S, which is identified by the read out telephone number (step S55).

On the other hand, if the port driver 8S in the data terminal 1S being in the waiting mode receives this request, it compares the telephone number of the sender memorized in step S45 with the telephone number notified this time (step S56). If both of the telephone numbers are the same, the port driver 8S in the data terminal 1S performs an off-hook operation (step S57). As a result, the communication between the data terminal 1C and the data terminal 1S is reestablished (step S58).

In this embodiment, as described above, even if a communication is interrupted for an unexpected cause, the communication is reestablished without notifying the upper applications 6C and 6S of the interruption of the communication in a case where it is possible to reestablish the communication. That is to say, for the upper application 6C and the upper application 6S, the connection has been maintained. Therefore, when the communication is reestablished, the data communication is restored retrospectively to the time of the interruption of the communication.

Next, operations of this embodiment are described with reference to FIGS. 6A to 6D in which a communication is interrupted while the client data terminal 1C is downloading data from the server data terminal 1S.

FIG. 6A shows a situation where the client data terminal 1C is downloading files stored in a memory in the server data terminal 1S. Data outputted from the communication application 61S in the data terminal 1S is sent to the data terminal 1C by the PPP 63S and the TCP 62S during the course of the operation. This data is sent to the communication application 61C by the PPP 63C and the TCP 62C in the data terminal 1C. The communication application 61C writes data thus received in a memory provided in the data terminal 1C in order.

FIG. 6B shows a situation where the communication line 5 is interrupted for an unexpected cause while the data terminal 1C is downloading data from the data terminal 1S. Under the conventional technology, when such an interruption happens, an interruption response code indicating the interruption of the communication circuit is sent to the communication applications in the data terminals. As a result, the data communication between them is ended.

FIG. 6C shows a situation where the interrupted communication line 5 is re-established. As described above, the operations for reestablishing the communication are performed only by the port driver 8C in the data terminal 1C and the port driver 8S in the data terminal 1S.

That is to say, even if the communication line 5 is interrupted, and an interruption response code is sent from the network, the port driver 8S in the server data terminal 1S does not inform the upper application 6S, i.e., the TCP 62S, the PPP 63S and the like, that the communication line has been interrupted. More specifically, the TCP 62S in the data terminal 1S does not recognize the interruption of the communication. Therefore, as it was doing before the communication was interrupted, the TCP 62C, for example, requests the communication port 7S to send data. A signal indicating an acknowledgement (ACK), however, is not sent back to the TCP 62S in response to the above request because the communication has been interrupted. As a result, until informed by the port driver 8S of a reestablishment or a disconnection of the communication, the upper application 6S repeats the operations to try to send the data that it was sending when the communication was interrupted.

Likewise, even if an interruption response code is sent from the network, the port driver 8C in the client data terminal 1C does not inform the upper application 6C that the communication has been interrupted. As a result, the TCP 62C and others repeat the same receiving operations that it was performing when the communication was interrupted.

FIG. 6D shows a situation after the reestablishing of the communication is completed. As shown in FIG. 6D, when the communication line 5 is reestablished, the data terminal 1S starts sending data to the data terminal 1C again. While the communication was interrupted, the upper application 6S in the data terminal 1S repeated the same sending operations that it had been performing at the time of the interruption. When the communication is reestablished, the upper application 6S starts sending the data that remained to be sent at the time of the interruption. Likewise, while a communication was interrupted, the upper application 6C in the data terminal 1C repeated the same receiving operations that it had been performing at the time of the interruption. When the communication is reestablished, the upper application 6C starts receiving the data that remained to be received at the time of the interruption. That is to say, the communication can be restored retrospectively to the time of the interruption of the communication line 5.

As described above, according to this embodiment, even if a communication is interrupted while the client data terminal is downloading data, a user of the data terminal does not need to start the same operations for downloading the data allover again from the beginning. Thus, this embodiment has an advantage of reducing a communication time and a communication charge.

C: Second Preferred Embodiment

The following describes a communication system using the communication control method according to the present invention. In this communication system, a facsimile transmits image data to or receives image data from another facsimile.

As shown in FIG. 7, this communication system includes facsimiles 10A and 10B and the communication line 5, which connects the facsimile 10A and the facsimile 10B.

The facsimile 10A includes an image outputting part 11A, an image reading part 12A, a central control part 13A, a FAX protocol control part 14A and a communication control part 15A. The image outputting part 11A receives from the central control part 13A image data sent from another facsimile and prints out this image data on a paper. The image read part 12A reads an image printed on a paper as an object of transmission by means of a CCD sensor and outputs the image data to the central control part 13A. The central control part 13A includes a CPU, a RAM and a ROM, and functions as a central controlling means. More specifically, the central control part 13A outputs to the image output part 11A image data sent from another facsimile through the communication line 5. The central control part 13A sends the image data from the image read part 12A to another facsimile through the communication line 5. The FAX protocol control part 14A functions to control an image transmission protocol in the facsimile 10A. In the following, the FAX protocol control part 14A, the central control part 13A, the image reading part 12A and the image outputting part 11A are collectively indicated as an upper application. This upper application is equivalent to the communication module 3A as shown in FIG. 1.

On the other hand, the communication control part 15A controls establishing or reestablishing of the communication line 5 between the facsimile 10A and the other facsimile 10B. This communication control part 15A is equivalent to the communication control module 2A as shown in FIG. 1.

The configuration of the facsimile 10B is similar to the configuration of the facsimile 10A. That is to say, the facsimile 10B includes an image outputting part 11B, an image reading part 12B, a central control part 13B, a FAX protocol control part 14B and a communication control part 15B. Because the functions of these parts are similar to those of the corresponding parts in the facsimile 10A, their explanations are omitted.

With reference to FIG. 7, operations of this embodiment will be described in which the facsimile 10A sends image data to the facsimile 10B.

First, when a user gives the facsimile 10A a command to send image data, the communication control part 15A sends a connection request to the facsimile 10B. When the communication control part 15B in the facsimile 10B receives this request, it writes ID information of the sender in a memory provided in the facsimile 10B (as shown by "A" in FIG. 7). The facsimile 10A is connected to the facsimile 10B through the communication line 5 after a series of operations such as a negotiation, an authentication and the like, are performed.

If the communication line 5 is interrupted for an unexpected cause, following processes are performed. First, an interruption response code such as "NO_CARRIER" is sent from the network to the communication control part 15A in the facsimile 10A and the communication control part 15B in the facsimile 15B (as shown by "B" in FIG. 7).

The communication control part 15B in the receiving facsimile 10B judges, based on the informed interruption response code, whether or not it is possible to reestablish the communication. If the communication control part 15B determines that it is possible to reestablish the communication, it starts waiting for a transmission from the sending facsimile 10A without informing the upper application of the interruption of the communication line 5 (as shown by "C" in FIG. 7). Likewise, the communication control part 15A in the sending facsimile 10A judges whether or not it is possible to reestablish the communication line. If the communication control part 15A determines that it is possible to reestablish the communication, it diagnoses the condition of the network. As a result of this diagnosis, if the communication control part 15A determines that the condition of the network has turned good, it sends a connection request to the facsimile 10B (as shown by "D" in FIG. 7). When the communication control part 15B in the facsimile 10B receives this request (as shown by "E" in FIG. 7), it compares the ID information of the sender included in this connection request with the ID information stored at the time of the first connection of the communication line (as shown by "F" in FIG. 7). If both of them are the same, the communication control part 15B performs the operations for reestablishing the communication line 5.

Next, with reference to FIGS. 8A to 8C, operations will be described that are taken when the communication line 5 is interrupted while the facsimile 10A is sending image data to the facsimile 10B.

Figure 8A:
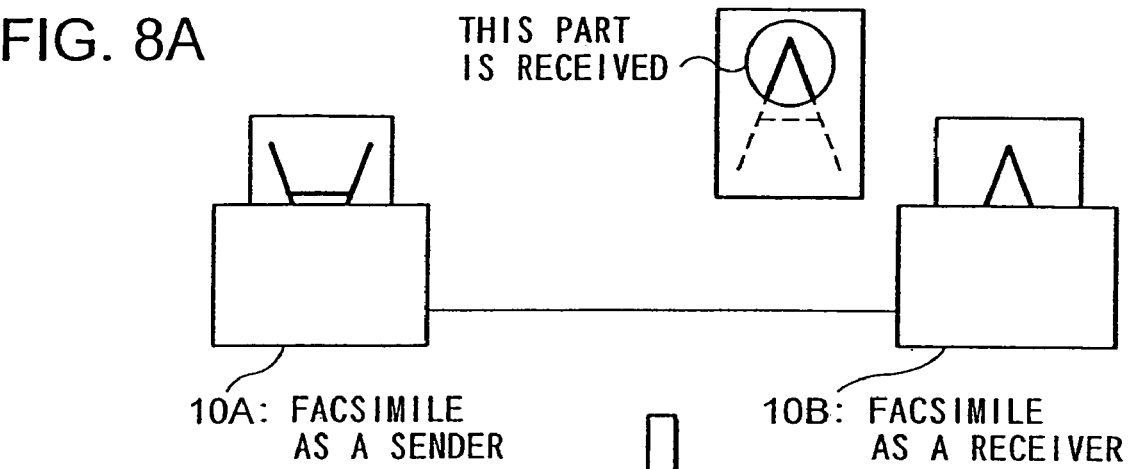
FIG. 8A is a block diagram showing a situation where a facsimile is sending image data to another facsimile through a communication network.
Figure 8B:
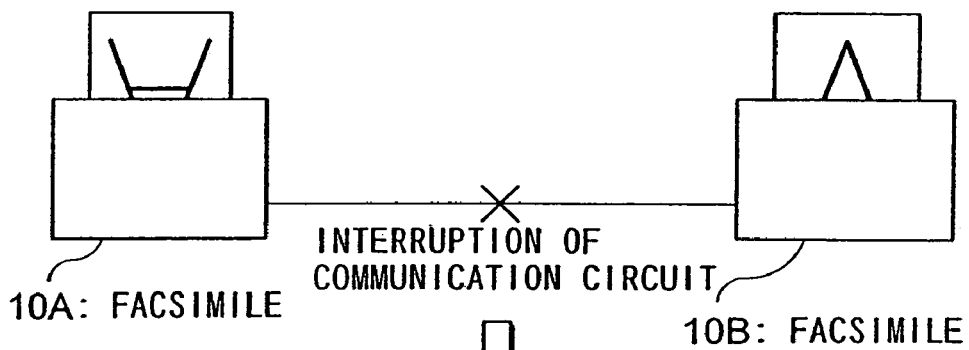
FIG. 8B is a block diagram showing a situation where the communication is interrupted.
Figure 8C:
FIG. 8C is a block diagram showing a situation where the interrupted communication is reestablished.

FIG. 8A shows a situation where the facsimile 10A is sending image data representing a letter "A" to the facsimile 10B. During the course of sending the data, even if the communication line 5 is interrupted for a cause (as shown in FIG. 8B), the upper application in each facsimile does not recognize the interruption of the communication in a case where it is possible to reestablish the communication. Therefore, the central control part 13A in the sending facsimile 10A repeatedly outputs the image data that remains to be sent at the time of the interruption of the communication line 5. Likewise, the central control part 13B also repeats the same operation that it was performing at the time of the interruption. Therefore, when the communication line 5 is reestablished, as shown in FIG. 8C, the sending facsimile 10A starts sending the image data that remained to be sent at the time of the interruption. The facsimile 10B starts receiving the image data that remained to be received at the time of the interruption. That is to say, the communication can be restored retrospectively to the time of the interruption of the communication.

Therefore, even if a communication is interrupted while image data is transmitted, a user of a facsimile does not need to start the operations for establishing a communication and send the image data allover again from the very beginning. Therefore, it is possible to reduce the load on a user and a charge required for re-sending data.

D: Third Preferred Embodiment

The following describes a communication system using the communication control method according to the present invention. In the system, data communication can be performed through portable telephones.

As shown in FIG. 9, this communication system includes a portable telephone 33, a communication adapter (PC card) 31, a cable 32, a portable data terminal 30, a radio base station 34, mobile radio communication control stations 35 and 37, a home memory station 36, a gateway station 38, a telephone network 39 and a data terminal 40. The portable data terminal 30 is a notebook-type personal computer, for example. Each of the portable data terminal 30 and the data terminal 40 includes the upper application 61 comprised of the communication application 61, the TCP 62 and PPP 63, the communication port 7 and the port driver 8, such as those provided in the data terminals 1C and 1S shown in FIG. 4. The portable data terminal 30 is connected with the portable telephone 33 through the cable 32 and the communication adapter 31. More specifically, one end of the cable 32 is connected to the portable telephone 33. The other end of the cable 32 is connected to the communication adapter 31, which is inserted in a card slot of the portable data terminal 30 and connected to the communication port 7. This communication adapter 31 functions as a modem to convert into radio signals data outputted from the portable data terminal 30. With the configuration described above, the portable data terminal 30 can transmit data to or receive data from the data terminal 40 through the communication network formed from the portable telephone 33, the radio base station 34, the mobile radio communication control stations 35 and 37, the gateway station 38 and the telephone network 39. The home memory station 36 has a database storing information regarding the present location of the portable telephone 33.

With these constructions in mind, processes for establishing a communication between the portable data terminal 30 and the data terminal 40 will be discussed below. In the following discussion, the portable data terminal 30 sends data to the data terminal 40.

First, given by a user a command to start a data communication, the communication application 61 in the portable data terminal 30 outputs a connection request. The portable telephone 33 sends this connection request to the radio base station 34, which form a wireless zone in which the portable telephone 33 is located. This connection request is sent to the data terminal 40 through the mobile radio communication control stations 35 and 37, the gateway station 38, the telephone network 39 and the like. After this, a series of operations including a negotiation, an authentication and the like are performed, and a communication between the portable data terminal 30 and the data terminal 40 is established.

Figure 10:
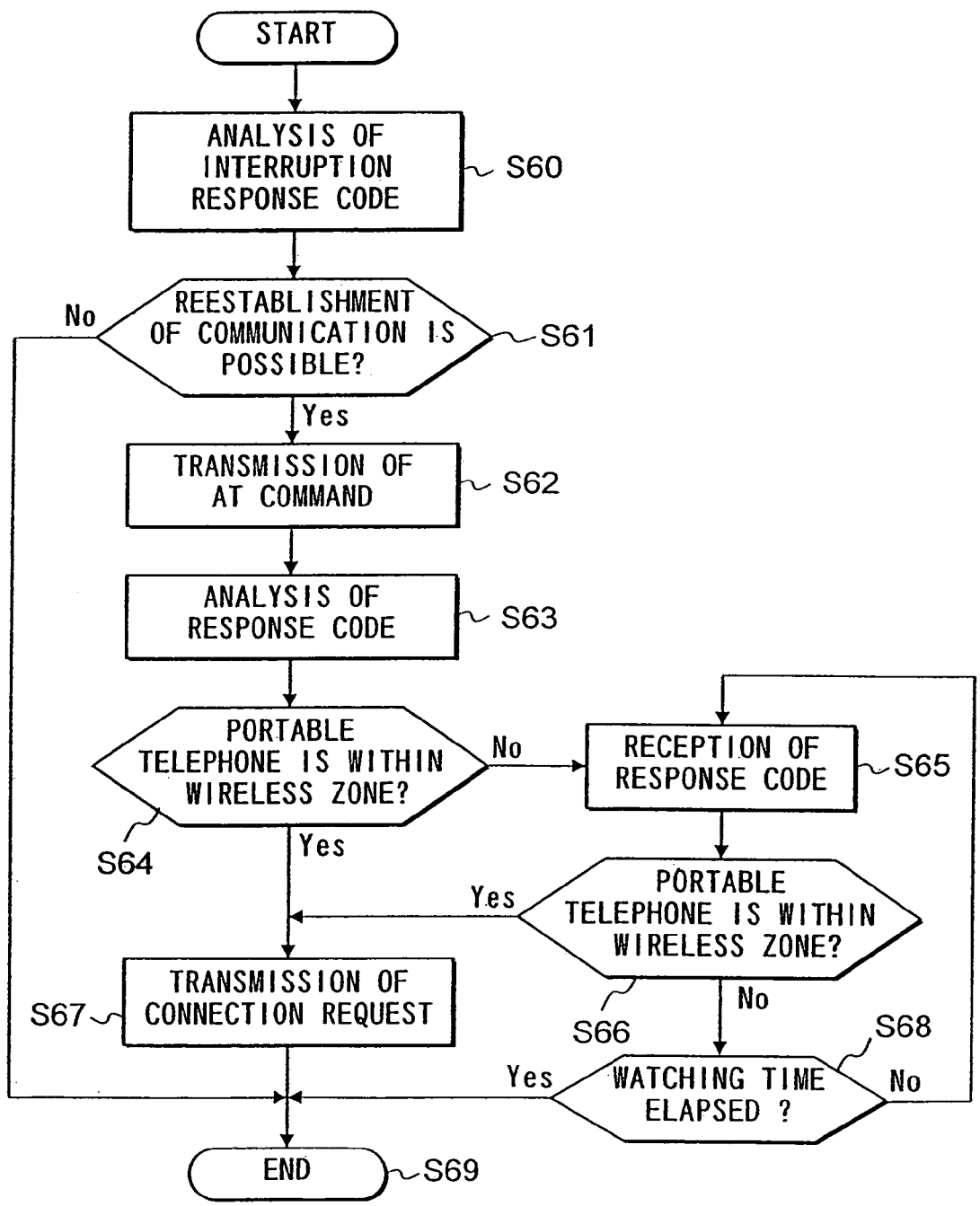
FIG. 10 is a flowchart showing operations of the same communication system.

FIG. 10 illustrates operations that are performed in the communication system according to this embodiment when a communication is interrupted for an unexpected cause.

First, when a communication is interrupted for an unexpected cause, the communication adapter 31 sends to the port driver 8 in the portable data terminal 30 an interruption response code including notification of the fact that the communication has been interrupted and the cause for the interruption. The port driver 8 judges, based on this interruption response code (step S60), whether or not it is possible to reestablish the communication (step S61).

If the port driver 8 in the portable data terminal 30 determines that it is impossible to reestablish the communication, it informs the upper application of the disconnection of the communication. Thereafter, the data communication between the portable data terminal 30 and the data terminal 40 ends (step S69). In contrast, if the port driver 8 determines that it is possible to reestablish the communication, it performs operations for reestablishing the communication without informing the upper application of the interruption of the communication. That is to say, these operations are as follows.

First, the port driver 8 sends to the communication adapter 31 an AT command to inquire the current condition of the portable telephone 33 (step S62). In response to this AT command, the communication adapter 31 sends to the port driver 8 a response code indicating whether or not the portable telephone 33 is within the wireless zone formed by the radio base station 34. The port driver 8 analyzes this response code (step S63), and it judges whether or not the portable telephone 33 is within the wireless zone (step S64). If the port driver determines that the portable telephone 33 is within the wireless zone, it sends a connection request to the communication adapter 31 (step S67).

In contrast, if the port driver 8 determines in step S64 that the portable telephone 33 is not within the wireless zone, it starts counting a waiting time. In addition, the port driver 8 repeatedly sends at regular intervals the AT command for inquiring the condition of the portable telephone 33. In response to the AT command sent from the port driver 8, the communication adapter 31 returns to the port driver 8 the response code indicating whether or not the portable telephone 33 is currently within the wireless zone.

If the port driver 8 receives the response code indicating that the portable telephone 33 moves within the wireless zone before the port driver 8 counts up to the waiting time (steps S65 and S66; Yes), the port driver 8 sends the connection request to the communication adapter 31 (step S67).

In contrast, if the port driver 8 does not receive the response code indicating that the portable telephone 33 moves within the wireless zone before the port driver 8 counts up to the waiting time (step S68; Yes), the port driver 8 informs the upper application of the disconnection of the communication. As a result, the operations for the data communication between the portable data terminal 30 and the data terminal 40 are ended (step S69).

On the other hand, if the connection request is sent from the port driver 8 in step S67, the communication adapter 31 forwards this connection request to the data terminal 40. The communication between the portable data terminal 30 and the data terminal 40 is thereby reestablished.

According to this embodiment described above, the same effects as the first preferred embodiment described above can be obtained. In addition, in this embodiment, the judgment as to whether to reestablish a communication is made based on whether or not the portable telephone 33 is within the wireless zone. Therefore, it is possible to eliminate the execution of the unnecessary operations in which a transmission for reestablishing the communication is repeated despite the fact that the portable telephone is not within the wireless zone.

In this embodiment, the AT command is used for inquiring the condition of a portable telephone, but other kinds of command may of curse be used instead of the AT command.

E: Variation Examples

The embodiments according to the present invention are described above, but variations may be added to these embodiments without departing from the gist of the present invention. Some of the variations are discussed below, for example.

(1) The functions of the communication control module as shown in FIG. 1 may not reside in the data terminal but may reside in the DCE, for example. The functions of the port drivers 8C and 8S as discussed in first preferred embodiment may reside in the PPP 63C and PPP 63S, the TCP 62C and TCP 62S or the communication applications 61C and 61S.

(2) The present invention can be applied to a communication through a leased line, a network of CATV or a LAN, a satellite communication, a radio communication, an infrared communication or the like, in addition to a communication through a public telephone network.

(3) In the first preferred embodiment, the data terminal has the PPP and the TCP, but it is possible to use, in place of the PPP, another protocol such as XMODEM, YMODEM, B_Plus, Kermit, Quick-VAN or the like.

(4) In the third preferred embodiment, the portable telephone is connected to the portable data terminal, but in place of the portable data terminal, other kinds of communication terminal such as a personal handy phone, a personal digital assistant or the like may be used.

(5) An arrangement may be possible in which a communication control program embodying the communication control method according to the present invention is store in a storage medium, and that the data terminal reads out the communication control program from the storage medium and execute it to implement the communication control method according to the present invention. That is to say, as shown in FIG. 9, a floppy disk 41 is provided for recording the communication control program. The communication control program recorded on the floppy disk is installed and executed in the data terminal. The communication control method according to the present invention may be realized in the form of the storage medium that stores the communication control program embodying the communication control method according to the present invention.

In the examples described above, the communication control program is recorded on the floppy disk, but a storage medium for storing this program is not limited to a floppy disk. Of course, various kinds of recording medium such as a CD-ROM may be available for storing the program.

The invention claimed is:

1. A communication control method for a data terminal which includes data communication module for transmitting data to or receiving data from another data terminal connected with the data terminal through a communication line, the method comprising:

detecting an interruption of the communication line; and
when it is detected that the communication line is interrupted, reestablishing the communication line without informing the data communication module of the interruption of the communication line,
wherein a wireless communication station forms a wireless zone, wherein the data terminal detects whether it is in the wireless zone, wherein the detecting step detects the interruption of the communication line based on receiving quality of the communication line at the data terminal, the receiving quality being determined based on whether the data terminal detects that it is in the wireless zone, and
wherein the reestablishment step comprises watching for the receiving quality for at least a predetermined watching time to determine whether the data terminal detects that it is in the wireless zone, and reestablishes reestablishing the communication line to the data terminal based on information determined for reestablishment of the communication line if the data terminal detects that it is in the wireless zone within the predetermined watching time.

2. A communication control method according to claim 1 further comprising judging whether to reestablish the interrupted communication line, wherein when it is detected that the communication line is interrupted, and it is judged that the communication line should be reestablished, the communication line is reestablished without informing the data communication module of the interruption of the communication line.

3. A communication control method according to claim 1, wherein the wireless communication station comprises a base station;
wherein the base station forms the wireless zone; and
wherein the receiving quality is determined to be good if the data terminal is found within the wireless zone.

4. A communication control method according to claim 3, wherein the data terminal comprises a mobile telephone.

5. A communication control method according to claim 3, further comprising judging whether to reestablish the interrupted communication line, wherein when the interruption of the communication line is detected, the interrupted communication line is reestablished without informing the data communication module of the interruption of the communication line.

6. A communication control method according to claim 5, wherein the data communication module performs data communication through a portable terminal which wirelessly communicates with the base station, and wherein judging whether to reestablish the interrupted communication line is based on whether or not the portable terminal is within the wireless zone of the base station and on the receiving quality of radio base stations around the portable terminal.

7. A communication control method according to claim 1 wherein watching for the receiving quality for at least a predetermined watching time to determine whether the data terminal detects that it is in the wireless zone comprises the data terminal periodically checking during the predetermined watching time whether it is in the wireless zone.

8. A communication control apparatus for controlling a data terminal with a data communication module for performing a data communication with another data terminal, the communication control apparatus comprising:

a detector for detecting an interruption of the communication line; and a communication controller for reestablishing, when the detector detects an interruption of the communication line, the communication line without informing the data communication module of the interruption of the communication line, wherein a wireless communication station forms a wireless zone, wherein the data terminal detects whether it is in the wireless zone, wherein the detector detects the interruption of the communication line based on receiving quality of the communication line at the data terminal, the receiving quality being determined based on whether the data terminal detects that it is in the wireless zone, and the communication controller watches for the receiving quality for at least a predetermined watching time to determine whether the data terminal detects that it is in the wireless zone, and reestablishes the communication line to the data terminal based on information determined for reestablishment of the communication line if the data terminal detects that it is in the wireless zone within the predetermined watching time.

9. A communication control apparatus according to claim 8 further comprising a judging module for judging whether to reestablish the interrupted communication line, wherein when the detector detects an interruption of the communication line, and the judging module determines that the communication line should be reestablished, the communication controller reestablishes the interrupted communication line without informing the data communication module of the interruption of the communication line.

10. A communication control apparatus according to claim 9, wherein the wireless communication station comprises a radio base station, and the judging module judges, based on whether or not the portable terminal is within the wireless zone of the radio base station and on the receiving quality of radio base stations around the portable terminal, whether to reestablish the interrupted communication line.

11. A communication control apparatus according to claim 8, wherein the wireless communication station comprises a base station;

wherein the base station forms the wireless zone; and wherein the receiving quality is determined to be good if the data terminal is found within the wireless zone.

12. A communication control method according to claim 11, wherein the data terminal comprises a mobile telephone.

13. A communication control method according to claim 11, further comprising a judging module for judging whether to reestablish the interrupted communication line, wherein when the detector detects an interruption of the communication line, and the judging module determines that the communication line should be reestablished, the communication controller reestablishes the interrupted communication line without informing the data communication module of the interruption of the communication line.

14. A communication control apparatus according to claim 13, wherein the data communication module performs data communication through a portable terminal which wirelessly communicates with the base station, and the judging module judges, based on whether or not the portable terminal is within the wireless zone of the base station and on the receiving quality of base stations around the portable terminal, whether to reestablish the interrupted communication line.

15. A communication control apparatus according to claim 8, wherein the communication controller watches for the receiving quality for at least a predetermined watching time by having the data terminal periodically check during the predetermined watching time whether the data terminal is in the wireless zone.

16. A computer readable storage medium that stores a communication control program executed by a data terminal which includes data communication module for performing data communication with another data terminal through a communication line, the program comprising the steps of:

detecting an interruption of the communication line; and when it is detected that the communication line is interrupted, reestablishing the communication line without informing the data communication module of the interruption of the communication line, wherein a wireless communication station forms a wireless zone, wherein the data terminal detects whether it is in the wireless zone, wherein the detecting step detects the interruption of the communication line based on receiving quality of the communication line at the data terminal, the receiving quality being determined based on whether the data terminal detects that it is in the wireless zone, and wherein the reestablishment step comprises watching for the receiving quality for at least a predetermined watching time to determine whether the data terminal detects that it is in the wireless zone, and reestablishing the communication line to the data terminal based on information determined for reestablishment of the communication line if the data terminal detects that it is in the wireless zone within the predetermined watching time.

17. A computer readable storage medium that stores a communication control program according to claim 16, the program further comprising the step of judging whether to reestablish the interrupted communication line, wherein when it is detected that the communication line is interrupted, and it is judged that the communication line should be reestablished, the communication line is reestablished without informing the data communication module of the interruption of the communication line.

18. A computer readable storage medium that stores a communication control program according to claim 16, wherein the with wireless communication station comprises a base station;

wherein the base station forms the wireless zone; and wherein the receiving quality is determined to be good if the data terminal is found within the wireless zone.

19. A computer readable storage medium that stores a communication control program according to claim 18, the program further comprising the step of judging whether to reestablish the interrupted communication line, wherein when the interruption of the communication line is detected, the interrupted communication line is reestablished without informing the data communication module of the interruption of the communication line.

20. A computer readable storage medium that stores a communication control program according to claim 19, wherein the data communication module performs data communication through a portable terminal which wirelessly communicates with the base station, and wherein the step of judging whether to reestablish the interrupted communication line is based on whether or not the portable terminal is within the wireless zone of the base station and on the receiving quality of radio base stations around the portable terminal.

21. A computer readable storage medium that stores a communication control program according to claim 16 wherein watching for the receiving quality for at least a predetermined watching time to determine whether the data terminal detects that it is in the wireless zone comprises the data terminal periodically checking during the predetermined watching time whether it is in the wireless zone.

* * * * *

UNITED STATES PATENT AND TRADEMARK OFFICE
CERTIFICATE OF CORRECTION

PATENT NO.       : 7,627,676 B2                                      Page 1 of 1
APPLICATION NO.  : 11/284777
DATED            : December 1, 2009
INVENTOR(S)      : Chikada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 61 days.

Signed and Sealed this

Twenty-first Day of December, 2010

David J. Kappos
*Director of the United States Patent and Trademark Office*